Sept. 20, 1955    A. J. ANDERSON ET AL    2,718,017
LEVER OPERATED MEANS TO DISENGAGE TAP
SPINDLE FRICTION DRIVE MEANS
Filed Oct. 1, 1952
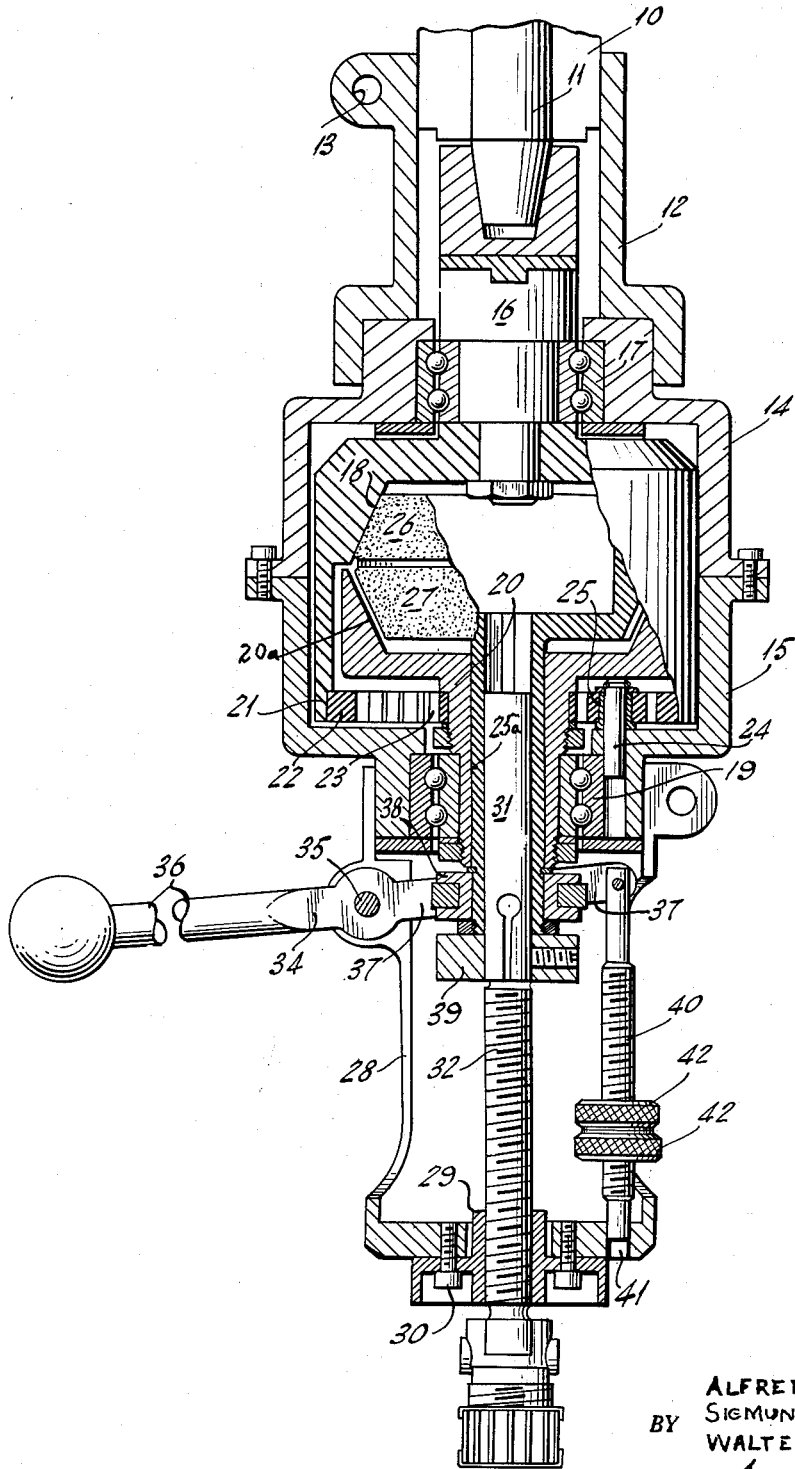
INVENTOR.
ALFRED ANDERSON
BY SIGMUND BERLANT
WALTER SIMS
ATTORNEY United States Patent Office 2,718,017
Patented Sept. 20, 1955

2,718,017

LEVER OPERATED MEANS TO DISENGAGE TAP SPINDLE FRICTION DRIVE MEANS

Alfred J. Anderson, Livingston, Sigmund Berlant, Caldwell, and Walter W. Sims, Stockholm, N. J.

Application October 1, 1952, Serial No. 312,562

2 Claims. (Cl. 10—136)

This invention relates to a device for precise tapping of threads.

This invention relates to the kind of tapping device in which the tap is driven through a reversible drive, and the tap is advanced by a lead screw. It is an object of this invention to provide a new and improved mechanisf of the type prescribed, in which the tapping is controlled in such a manner as to drive the tap forward while it is carried down by the lead screw and to reverse its drive as soon as it is urged upwardly, so that no axial thrust is exerted upon the threads by the tap, and to control the tapping operation in such a manner that a single instrumentality such as a lever is used to control the operation, without the possibility that a wrong actuation of the instrumentality may break the tap.

The drawing shows a central vertical section through a mechanism involving this invention.

In the drawings, the numeral 10 represents the hollow quill of a drill press, carrying the rotating shaft 11.

A quill clamp 12 is clamped as shown at 13 upon the quill and carries a cup-shaped casing member 14, the rim of which is clamped to a mating cup-shaped member 15, which together form a chamber housing a reversible drive.

Attached to and driven by the shaft 11 is a stub shaft 16 journalled in a ball bearing 17 and carrying a downwardly facing cone-shaped socket 18. Journalled in a bearing 19 in the member 15 is a member 20 having an upwardly facing cone shaped socket 20a. The socket 18 has its lower edge 21 extending down below the socket 20a and provided with internal teeth 22 and the member 20 has teeth 23 in alignment therewith. A stub shaft carries a gear 25 meshing with teeth 23 and 22 to drive member 20 in reverse direction.

A hollow shaft 25a is rotatably and slidably mounted in member 20 and carries at its upper end a head having the shape of two cones 26 and 27 base to base, the cone 26 being shaped to mate with socket 18 and cone 27 to mate with socket 20a in the usual manner, the cones being so spaced that only one meshes at a time. These members 18 and 20 comprise forward and reverse drive elements, and the members 26 and 27 together comprise a driving head movable to engage either one.

Mounted on the member 15 is a frame 28 carrying at its lower end a nut 29 which is detachably attached by screws 30.

A drive shaft 31 is splined within member 27 and carries at its lower end lead screw 32 meshing in nut 29.

A lever 34 pivoted at 35 to frame 28, has one end 36 extending outwardly as an operating handle, while the other end 37 is connected to the lower end of member 25a by a slip ring connection 38, whereby the handle 36 may, by moving downward, cause cone 26 to engage socket 18 for direct drive, or by moving upward may cause cone 27 to engage socket 20a for reverse drive. With this position it will be seen that member 20 (and also lever 37) has three positions, an upper forward drive position, a lower reverse drive position and a neutral or center position.

A stop collar 39, fixed upon shaft 31 forces ring 38 and member 27 up to neutral position, to disengage the reverse drive as soon as the upward movement is completed.

A screw rod 40, pivoted to the end of lever 37 and sliding in a socket 41 in the frame, carries lock nuts 42 in position to be contacted by stop collar 39 when the desired depth of thread is cut. This depression of rod 40 pulls down 37 and 38 to neutral position, thereby disengaging drive member 26 from socket 18, thereby stopping the downward motion. The cycle may then be completed by pressing upon lever 36 to engage the reverse drive. The final contact of the stop collar 29 with the slip ring connection 38 finally stops the upward motion.

The lead screw 32 has at its lower end a suitable chuck 44 which may grasp and position the taps.

The operation of this device will be obvious from the construction. The quill of the press may be lowered to give the tap only a limited clearance above the work, and clamped there. The stop nuts 42 may then be adjusted to give the desired depth and locked against each other.

Thereafter, until the machine is set, each hole that is tapped will start the thread with the same angular position and the tapping will be completely uniform. Because of the precision cut lead screw there is a tendency for irregularities even in the cutting of the tap to balance out.

It will be seen moreover, that once the machine is set, the only operation required, aside from the placing of the work in position, is to move the lever down to cut the thread, then when the shaft stops to move the lever up to withdraw the tap.

What is claimed is:

1. A device of the character described comprising a frame, a shaft journalled in said frame having its lower end connected to drive a housing, having upper forward and a lower reverse friction drive elements, a hollow shaft journalled in said frame carrying a friction clutch head and extending downwardly from said head, said head normally being out of engagement with said drive elements and being adapted to be brought into engagement with said forward drive element by upward movement of said shaft, and into engagement with said reverse drive element by downward movement thereof, a driven shaft splined within said hollow shaft carrying a means for holding a precision lead screw at its lower end, and a means upon said frame to carry a nut for cooperation with said lead screw, a lever pivoted to said frame having an arm articulated to said hollow shaft to move said shaft up and down, means movable with the driven shaft to move the lever to neutral position at the close of the upward movement of the screw, and means to move the lever from forward position to neutral position at any predetermined point in the downward movement of the screw.

2. A device according to claim 1 in which the means movable with the drive shaft is a collar and the last mentioned means comprises a screw pivoted to said lever and slidable parallel to the precision lead screw and having a nut thereon in position to be engaged by said collar.

References Cited in the file of this patent

UNITED STATES PATENTS

| 1,079,973 | Brozek | Dec. 2, 1913 |
| 1,754,978 | Buss | Apr. 15, 1930 |
| 2,154,793 | Weber | Apr. 18, 1939 |
| 2,380,387 | Allen | July 31, 1945 |